United States Patent
Camenisch et al.

(10) Patent No.: US 12,353,869 B2
(45) Date of Patent: Jul. 8, 2025

(54) UPDATE SOFTWARE REPLICA IN A DISTRIBUTED SYSTEM

(71) Applicant: DFINITY STIFTUNG, Zürich (CH)

(72) Inventors: Jan Camenisch, Thalwil (CH); Manu Drijvers, Zürich (CH); Johan Granström, Kilchberg (CH); Stefan Kaestle, Zürich (CH); Yvonne-Anne Pignolet, Zurich (CH)

(73) Assignee: DFINITY STIFTUNG, Zürich (CH)

( * ) Notice: Subject to any disclaimer, the term of this patent is extended or adjusted under 35 U.S.C. 154(b) by 159 days.

(21) Appl. No.: 18/272,325

(22) PCT Filed: Jan. 14, 2021

(86) PCT No.: PCT/EP2021/050679
§ 371 (c)(1),
(2) Date: Jul. 13, 2023

(87) PCT Pub. No.: WO2022/152383
PCT Pub. Date: Jul. 21, 2022

(65) Prior Publication Data
US 2024/0311124 A1    Sep. 19, 2024

(51) Int. Cl.
*G06F 8/65*    (2018.01)
(52) U.S. Cl.
CPC .................................... *G06F 8/65* (2013.01)
(58) Field of Classification Search
USPC ....................................................... 717/168
See application file for complete search history.

(56) References Cited

U.S. PATENT DOCUMENTS 7,433,928 B1 *  10/2008  Ranade ................. H04L 67/104
                                                          709/216
7,478,400 B1 *   1/2009  Banerjee ................. G06F 16/10
                                                          709/201

(Continued)

OTHER PUBLICATIONS

"An Introduction to PBFT Consensus Algorithm"; Medium.com website [full UEL included in ref.]; Oct. 22, 2020 (Year: 2020).*

(Continued)

*Primary Examiner* — Bradley A Teets
*Assistant Examiner* — Clint Thatcher
(74) *Attorney, Agent, or Firm* — Mannava & Kang, P.C.

(57) ABSTRACT

Embodiments of the invention relate to a distributed network. The distributed network comprises a replicated computing cluster and the replicated computing cluster comprises a plurality of nodes. Each of the plurality of nodes of the replicated computing cluster is configured to run a replica and each of the replicas is configured to run one or more computational units. Furthermore, each of the replicas is configured to perform consecutive processing rounds. The consecutive processing rounds comprise a consecutive processing of input blocks in a deterministic and replicated manner and thereby a sequence of round states is computed. Each of the replicas is further configured to perform software upgrades of the replica at handover states of pre-agreed handover rounds of the consecutive processing rounds and to provide, upon request of another replica, via a communication interface that is independent of the software upgrades, a handover package. The handover package is configured to enable an obtainment of the handover state.

20 Claims, 13 Drawing Sheets

(56) References Cited

U.S. PATENT DOCUMENTS

| | | | | |
|---|---|---|---|---|
| 7,734,820 B1* | 6/2010 | Ranade | ............... | G06F 16/10 |
| | | | | 709/212 |
| 2005/0086384 A1* | 4/2005 | Ernst | ............... | G06F 16/178 |
| | | | | 709/248 |
| 2019/0278483 A1* | 9/2019 | Mahmood | ............ | G06F 3/0604 |

OTHER PUBLICATIONS

Baliga A.; "Understanding Blockchain Consensus Models" Persistent. Apr. 4, 2017;4(1):14. (Year: 2017).*

Yakovenko, Anatoly. "Solana: A New Architecture for a High Performance Blockchain v0. 8.13."; Solana.com website [full URL included in ref.]; (Year: 2018).*

"The International Preliminary Report Application No. PCT/EP2021/050679", Mar. 17, 2023, 76 pages.

Bandara Dilum et al., "Patterns for Blockchain Migration Complex Event Processing in GPU View project A Resource and Policy Aware VM Scheduler for Medium-Scale Clouds View project", Jun. 26, 2019, pp. 1-29.

Chepurnoy Alexander et al., "Rollerchain, a Blockchain With Safely Pruneable Full Blocks", Aug. 23, 2016, pp. 1-14.

Clow John et al., "A Byzantine Fault Tolerant Raft", Apr. 10, 2018, pp. 1-6.

Matzutt Roman et al., "How to Securely Prune Bitcoin's Blockchain", 2020 IFIP Networking Conference (Networking), Jun. 22, 2020 IFIP, Jun. 22, 2020, pp. 298-306.

Michele Ciampi et al., "Updatable Blockchains", IACR, 20200715 International Association for Cryptologic Research, vol. 20200716:133651, Sep. 18, 2020, pp. 1-20.

Timo Hanke et al., "DFINITY Technology Overview Series Consensus System", May 11, 2018, 16 pages.

* cited by examiner

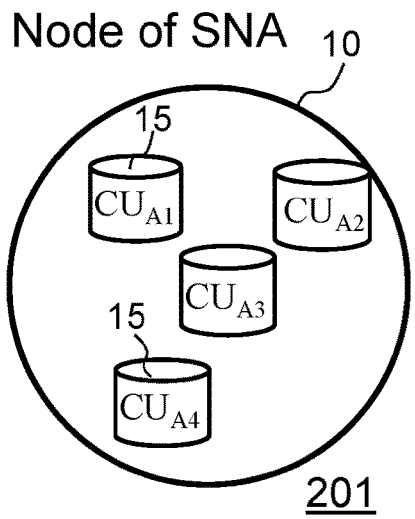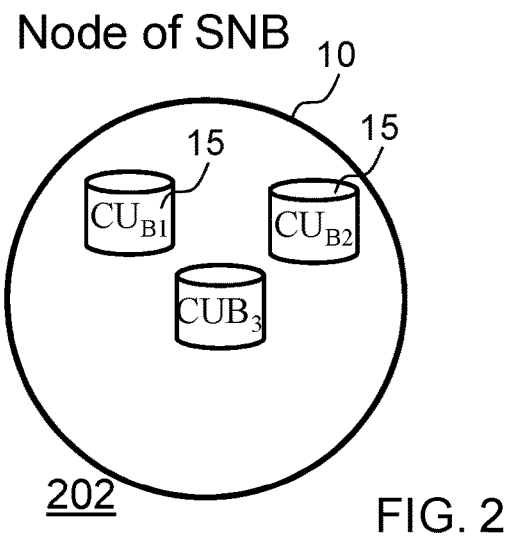
FIG. 2
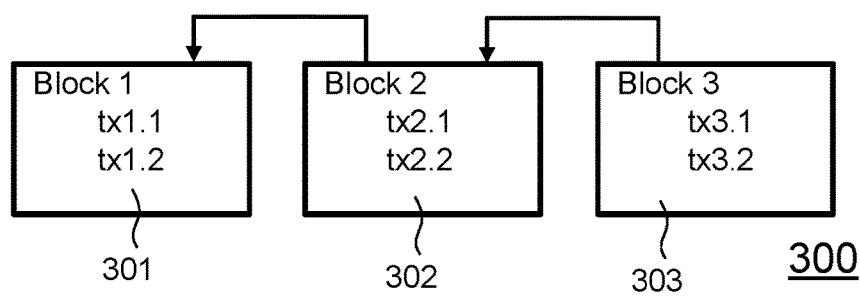
FIG. 3
FIG. 4

UPDATE SOFTWARE REPLICA IN A DISTRIBUTED SYSTEM

CLAIM FOR PRIORITY

The present application is a national stage filing under 35 U.S.C 371 of PCT application number PCT/EP2021/050679, having an international filing date of Jan. 14, 2021, the disclosure of which is hereby incorporated by reference in its entirety.

TECHNICAL FIELD

The present invention pertains to a distributed network comprising a replicated computing cluster. The replicated computing cluster comprises a plurality of nodes. Each of the plurality of nodes of the replicated computing cluster is configured to run a replica.

Further aspects relate to a computer-implemented method, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may call small programs known e.g. as smart contracts.

In order for a transaction to be written to the blockchain, it must be "validated" and agreed upon by the network. In other words, the network nodes have to reach consensus on blocks to be written to the blockchain. Such a consensus may be achieved by various consensus protocols.

In one type of blockchain networks, consensus is achieved by using a proof-of-work algorithm. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols is based on a proof-of-stake algorithm. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Consensus protocols used in blockchain networks can be designed to reach fast finality on transactions contained in blocks by applying a "Byzantine fault tolerant" (BFT) agreement protocol. "Synchronous" BFT protocols rely on network synchrony assumptions for safety, while "asynchronous" BFT protocols do not. Asynchronous BFT protocols can typically tolerate less than ⅓ (one third) corrupt participating nodes.

Apart from cryptocurrencies, distributed networks may be used for various other applications.

In particular, they may be used for providing decentralized and distributed computing capabilities and services.

One challenge of such distributed networks which provide distributed computing services is to provide software upgrades to the nodes, in particular to the replicas that run on the nodes.

DISCLOSURE OF THE INVENTION

Accordingly, one object of an aspect of the invention is to provide a distributed network having an advantageous mechanism for performing software upgrades, in particular software upgrades of replicas which run on the nodes of the distributed network.

According to an embodiment of a first aspect of the invention there is provided a distributed network. The distributed network comprises a replicated computing cluster and the replicated computing cluster comprises a plurality of nodes. Each of the plurality of nodes of the replicated computing cluster is configured to run a replica and each of the replicas is configured to run one or more computational units. Furthermore, each of the replicas is configured to perform consecutive processing rounds. The consecutive processing rounds comprise a consecutive processing of input blocks in a deterministic and replicated manner and thereby a sequence of round states is computed. Each of the replicas is further configured to perform software upgrades of the replica at handover states of pre-agreed handover rounds of the consecutive processing rounds and to provide, upon request of another replica, via a communication interface that is independent of the software upgrades, a handover package. The handover package is configured to enable an obtainment of the handover state.

Such an embodied method allows an efficient and reliable software upgrade of the replicas of the subnetwork. More particularly, in contrast to a canary approach, all of the replicas perform the software upgrade commonly at the same handover round in a kind of round-synchronized manner. However, this does not mean that all of the replicas perform the software upgrade at the same time. Hence, according to embodiments, the plurality of replicas may work asynchronously in terms of timing and perform the software upgrades asynchronously at different points in time, but they work synchronously in terms of processing rounds and perform the software updates round-synchronously at the same handover round and at the same handover state.

According to embodiments of the invention a node that is behind during the software upgrade can still successfully upgrade by obtaining the handover state from other nodes of the network by means of requesting the handover package from one or more of the other nodes of the network. The handover package comprises information which enables an obtainment of the handover state. According to embodiments the handover package comprises a complete set of information which allows to synchronize the round state of a node that is behind during a software upgrade with the latest handover state.

A computational unit may be defined as a piece of software that is running on the network and which has its own unit/round state. According to embodiments, a computational unit may be defined as a deterministic program.

According to an embodiment, the handover package may comprise the handover state or a hash of the handover state. This facilitates an efficient and quick catch-up of a node that is behind. The embodiment according to which the handover package comprises only a hash of the round state has the advantage that the respective node may verify first the hash and only download the complete round state in case of a positive verification of the hash. This may avoid to download the complete state unnecessarily. In case the verification of the hash is positive, the (complete) round state itself may be fetched separately. For ease of illustration/description, in the following the term round state may also include or refer to a hash of a round state as appropriate.

According to another embodiment, the handover package comprises a complete set of the previous input blocks. According to this embodiment, a node that is behind may catch up with the handover state by computing the handover state from the complete set of the previous input blocks.

According to another embodiment, the handover package may also comprise the input block to be processed in the subsequent processing rounds. This enables the catch-up node to compute also the next round state subsequent to the handover state.

A node that is behind during the upgrade may request and receive the handover package via a communication interface that is independent of the software upgrade. In other words, the software upgrades do not change this communication interface and the associated communication protocol. This generally allows that nodes which run different versions of the replica software may communicate with each other and in particular it allows a catch-up node which runs an outdated software version of the replica to communicate with nodes which have already upgraded to a new/newer replica version of the software. According to an embodiment the communication interface may be an http-endpoint or an https-interface. This is particularly efficient.

According to an embodiment, the distributed network is configured to perform the software upgrades from a current software version of the replica to a new software version of the replica by performing the processing rounds up to and including the computing of the handover state of the pre-agreed handover round with the current software version. Then the distributed network, more particularly the nodes of the replicated computing cluster, install the new software version and perform the processing rounds subsequent to the handover round with the new software version starting from the handover state.

This provides a clear cut-off point for the software upgrades.

According to embodiments, the new software version of the replica may change only a part of the replica software.

The pre-agreeing on the respective handover-round may be performed in various ways according to embodiments. According to one embodiment, the pre-agreed handover rounds are regularly repeated at predefined upgrade intervals, wherein the predefined upgrade intervals comprises a predefined number of processing rounds. Such a scheme facilitates an efficient and reliable execution of the software upgrades. More particularly, it is pre-agreed or in other words predefined in advance at which ones of the processing rounds possible software upgrades may take place. Such a pre-agreed scheme may avoid or reduce the communication between the nodes on the timing of the software updates. Rather each of the nodes knows in advance the handover rounds.

According to an embodiment, the replicas of the replicated computing cluster are configured to regularly request the current handover package from other nodes of the replicated computing cluster or from an independent party at predefined request intervals. This is an efficient way to ensure a synchronization between the nodes/replicas.

According to another embodiment the replicas of the replicated computing cluster are configured to request the handover package from other nodes of the replicated computing cluster or from an independent party on demand. Such a demand may be in particular given before starting the software upgrade and/or if a replica can no longer process input blocks due to a software incompatibility.

According to embodiments the handover package may not only be requested from other nodes of the replicated computing cluster, but also from an independent party. Such an independent party may be e.g. a dedicated node of the distributed network that is assigned to store and provide the handover packages.

According to an embodiment, the distributed network is configured to run a registry. The registry, in particular a central registry, may be configured to provide consecutive registry versions and the consecutive registry versions may comprise replica versions to be used by the replicas. The distributed network may be further configured to trigger software upgrades of the replicas by changing the replica versions in the registry versions. Then, the nodes of the distributed network may observe the central registry for changes of their replica version and may then trigger a software upgrade, e.g. at the next handover round.

According to embodiments, the distributed network may be configured to use, for a given upgrade interval, the replica version of the registry version of the handover round of the previous upgrade interval. This provides some lead time for the nodes/replicas to prepare the software upgrade.

According to embodiments, the distributed network may be configured to perform, by a consensus subset of the plurality of nodes, consensus rounds, the consensus rounds being configured to reach a consensus on the input blocks to be processed by the plurality of nodes. The distributed network may be configured to run the consecutive consensus rounds in an overlapping manner at least partly in parallel to each other. According to such an embodiment, there may be several input block proposals pending per consensus round until a final agreement on an input block for the consensus round has been reached. Such a consensus scheme may be denoted as chain-based consensus. The distributed network may be further configured to create, after having reached a handover round, consecutive dummy input block proposals until a final agreement on the input block of the handover round has been reached and to perform the software upgrade of the replica after the final agreement. The dummy input block proposals may be discarded then and new input block proposals may be created based on the handover state.

Such an embodiment may ensure that the consensus round of the handover height will eventually become finalized. The dummy input block proposals according to such an embodiment do not have any payload that needs to be processed as they are only produced to ensure finalization and any payload after the handover height should be processed based on the new software version of the replicas.

According to embodiments, the distributed network may comprise a plurality of subnetworks, wherein each of the plurality of subnetworks comprises a set of assigned nodes. The replicas of the assigned nodes of the plurality of subnetworks are configured to perform a deterministic and replicated computation across their respective subnetworks, thereby forming a plurality of replicated computing clusters.

Such a network may provide enhanced flexibility by distributing the computations over several subnetworks.

According to embodiments, the distributed network is configured to exchange inter-subnetwork messages between nodes assigned to different subnetworks according to a compatible communication protocol such that different software versions of the replicas of different subnetworks can communicate with each other. This ensures that the different subnetworks may operate with different software versions of their replica and that nevertheless the nodes and computational units of these different subnetworks may communicate with each other. Furthermore, the distributed network is configured to exchange intra-subnetwork messages between nodes assigned to the same subnetwork according to a dynamic communication protocol. As the handover packages and the handover rounds establish a clear cut-off point for the change of the software version of the replicas of a subnetwork, the communication protocol for the nodes within a subnetwork may be changed dynamically from software version to software version. This provides enhanced flexibility and functionality for the distributed network.

According to an embodiment, the distributed network is configured to perform regular updates of the consecutive registry versions in the registry, the registry versions comprising a subnetwork allocation of the plurality of nodes and a respective software version of the replicas for each of the plurality of subnetworks. According to embodiments the e network may be further configured to perform, by the plurality of nodes, regular registry queries to receive changes of its respective software version. This is an efficient way to communicate registry changes to the nodes of the network.

According to embodiments the software upgrade may comprise a different consensus protocol for reaching consensus on the input blocks, a different communication protocol for the communication between the plurality of nodes, in particular for intra-subnetwork communication and/or new or updated processing rules for the processing of the input blocks. This provides a distributed network with enhanced flexibility and with the possibility to evolve over time in an advantageous manner.

According to embodiments, the handover package provides the handover state as a Merkle-tree structure, in particular as the hash root of the Merkle-tree structure.

This allows a memory efficient storage.

According to an embodiment, the distributed network is configured to execute, by a permissible subset of the nodes of the replicated computing cluster or by a permissible subset of the nodes of a respective subnetwork, a joint signature on the handover package, in particular a threshold signature. Such a signature allows the catch-up node to verify the handover package by means of the corresponding public verification key.

According to an embodiment, the distributed network is configured to perform the software upgrade only when the joint signature on the handover package has been executed. This ensures that the nodes have indeed agreed on a clear-cut off point before they proceed with a new software version.

According to an embodiment, the input blocks comprise the latest registry version that the proposer of the input block is aware of. This may ensure that the registry version increases over time and that adversaries may not misuse old registry versions.

According to an embodiment, the distributed network may be configured to add the handover package to one of the blocks of the predefined intervals, in particular to the first block of the predefined intervals.

This facilitates an efficient implementation of the method as well as an easy access to the handover package for catch-up-nodes.

According to an embodiment of another aspect a computer-implemented method for operating a distributed network is provided. The distributed network comprises a replicated computing cluster, the replicated computing cluster comprising a plurality of nodes. Each of the plurality of nodes of the replicated computing cluster is configured to run a replica. The method comprises steps of running, by each of the replicas, one or more computational units and performing, by each of the replicas, consecutive processing rounds comprising a consecutive processing of input blocks in a deterministic and replicated manner, thereby computing a sequence of round states. The method comprises further steps of performing, by each of the replicas, software upgrades of the replica at handover states of pre-agreed handover rounds of the consecutive processing rounds and providing, upon request of another replica, via a communication interface that is independent of the software upgrades, a handover package, the handover package being configured to enable an obtainment of the handover state.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 2 illustrates in a more detailed way computational units running on exemplary nodes of the network;

FIG. 3 illustrates the creation of blocks in distributed networks according to embodiments of the invention;

FIG. 4 shows the evolvement of registry versions of a central registry;

MODES FOR CARRYING OUT THE INVENTION

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A verification key: a bit-string of a public key signature scheme intended to be widely publicized. A verification key may also be denoted as public key and may be used e.g. for the verification of digital signatures of the public key signature scheme.

A public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key, enabling some cryptographic operation, in particular digitally signing a message.

Distributed key generation (DKG): a protocol enabling a set of dealers to create a public key, in particular a verification key, and provide a set of receivers with a secret key share of the corresponding secret key.

Figure 1:
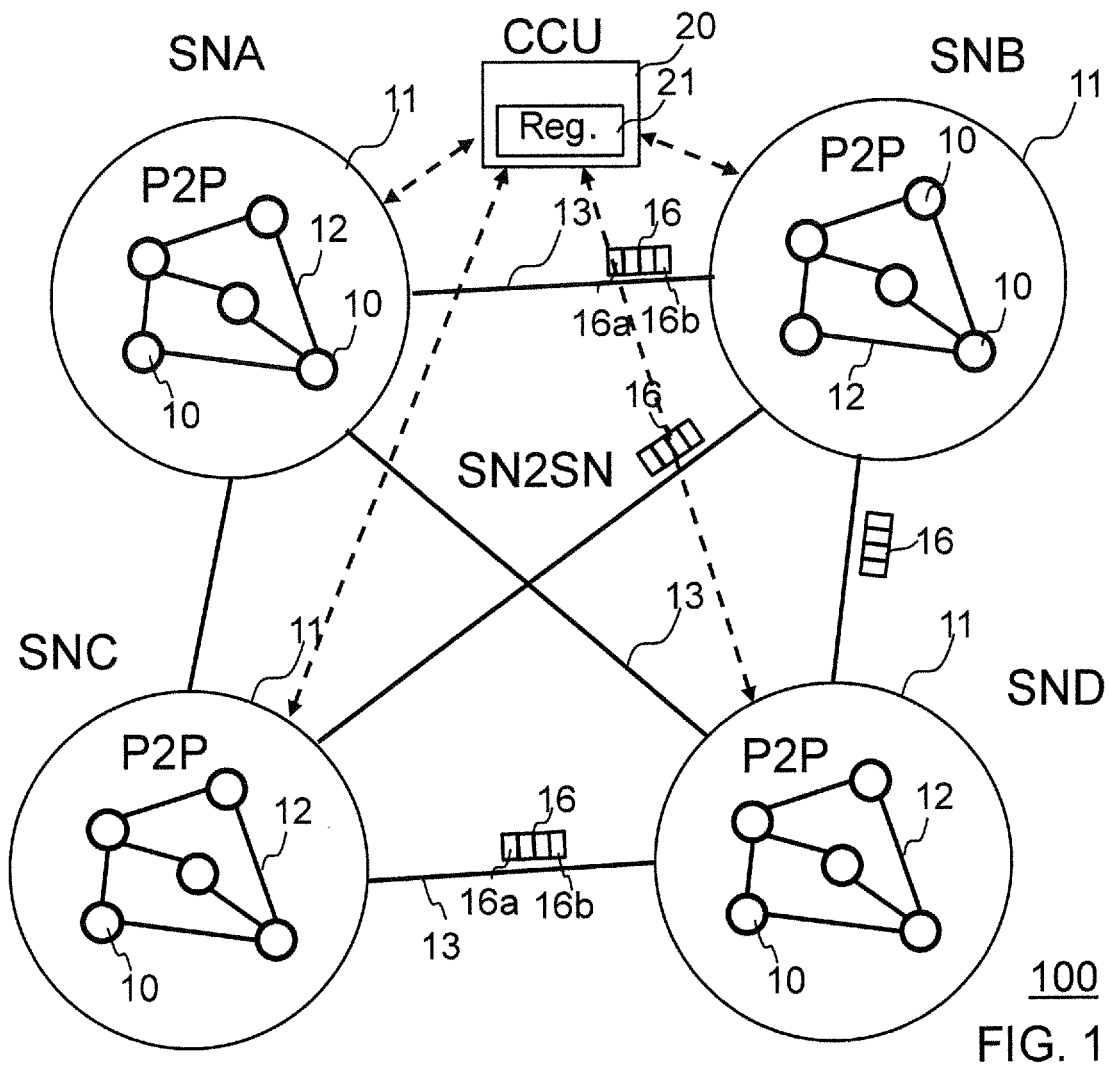
FIG. 1 shows an exemplary diagram of a distributed network according to an embodiment of the invention.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are assigned to a plurality of replicated computing clusters 11. The replicated computing clusters 11 establish and may be in the following denoted as subnetworks 11. In the example of FIG. 1, four subnetworks 11 denoted with SNA, SNB, SNC and SND are provided.

Each of the plurality of subnetworks 11 is configured to run a set of computational units on each node 10 of the respective subnetwork 11. According to embodiments, a computational unit shall be understood as a piece of software, in particular as a piece of software that comprises or has its own unit state or in other words execution state.

The network 100 comprises communication links 12 for intra-subnetwork communication within the respective subnetwork 11, in particular for intra-subnetwork unit-to-unit messages to be exchanged between computational units assigned to the same subnetwork.

Furthermore, the network 100 comprises communication links 13 for inter-subnetwork communication between different ones of the subnetworks 11, in particular for inter-subnetwork unit-to-unit messages to be exchanged between computational units assigned to different subnetworks.

Accordingly, the communication links 12 may also be denoted as intra-subnetwork or Peer-to-Peer (P2P) communication links and the communication links 13 may also be denoted as inter-subnetwork or Subnetwork-to-Subnetwork (SN2SN) communications links.

According to embodiments, a unit state shall be understood as all the data or information that is used by the computational unit, in particular the data that the computational unit stores in variables, but also data the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments of the invention the subnetworks 11 are configured to replicate the set of computational units across the respective subnetwork 11. More particularly, the subnetworks 11 are configured to replicate the unit state of the computational units across the respective subnetwork 11.

The network 100 may be in particular a proof-of-stake blockchain network.

The distributed network 100 comprises a central control unit CCU, 20. The central control unit 20 may comprise a central registry 21 to provide network control information to the nodes of the network. The central control unit 20 may trigger in particular software upgrades of the replica which run on the nodes of the respective replicated computing cluster/subnetwork.

FIG. 2 illustrates in a more detailed way computational units 15 running on nodes 10 of the network 100. The network 100 is configured to assign each of the computational units which are running on the network 100 to one of the plurality of replicated computing clusters/subnetworks, in this example to one of the subnetworks SNA, SNB, SNC or SND according to a subnetwork-assignment. The subnetwork-assignment of the distributed network 100 creates an assigned subset of the whole set of computational units for each of the subnetworks SNA, SNB, SNC and SND.

More particularly, FIG. 2 shows on the left side 201 a node 10 of the subnetwork SNA of FIG. 1. The subnetwork assignment of the distributed network 100 has assigned a subset of four computational units 15 to the of subnetwork SNA more particularly the subset computational units $CU_{A1}$, $CU_{A2}$, $CU_{A3}$ and $CU_{A4}$. The assigned subset of computational units $CU_{A1}$, $CU_{A2}$, $CU_{A3}$ and $CU_{A4}$ runs on each node 10 of the subnetwork SNA. Furthermore, the assigned subset of computational units $CU_{A1}$, $CU_{A2}$, $CU_{A3}$ and $CU_{A4}$ is replicated across the whole subnetwork SNA such that each of the computational units $CU_{A1}$, $CU_{A2}$, $CU_{A3}$ and $CU_{A4}$ traverses the same chain of unit states. This may be implemented in particular by performing an active replication in space of the unit state of the computational units $CU_{A1}$, $CU_{A2}$, $CU_{A3}$ and $CU_{A4}$ on each of the nodes 10 of the subnetwork SNA.

Furthermore, FIG. 2 shows on the right side 202 a node 10 of the subnetwork SNB of FIG. 1. The subnetwork assignment of the distributed network 100 has assigned a subset of 3 computational units 15 to the subnetwork SNB, more particularly the assigned subset of computational units $CU_{B1}$, $CU_{B2}$ and $CU_{B3}$. The assigned subset of computational units $CU_{B1}$, $CU_{B2}$ and $CU_{B3}$ runs on each node 10 of the subnetwork SNB. Furthermore, the assigned subset of computational units $CU_{B1}$, $CU_{B2}$, and $CU_{B3}$ is replicated across the whole subnetwork SNB such that each of the computational units $CU_{B1}$, $CU_{B2}$, and $CU_{B3}$ traverses the same unit states/round states.

FIG. 3 illustrates the creation of blocks in distributed networks according to embodiments of the invention. The blocks may be in particular input blocks which are to be processed by the computational units of the replicas of a replicated computing cluster. The input blocks which are to be processed by the replicated computing cluster have been agreed upon by a consensus subset of the respective nodes/replicas of the replicated computing cluster.

In this exemplary embodiment three input blocks 301, 302 and 303 are illustrated. Block 301 comprises a plurality of transactions, namely the transactions tx1.1, tx1.2 and possibly further transactions indicated with dots. Block 302 comprises also a plurality of transactions, namely the transactions tx2.1, tx2.2 and possibly further transactions indicated with dots. Block 303 also comprises a plurality of transactions, namely the transactions tx3.1, tx3.2 and possibly further transactions indicated with dots. The input blocks 301, 302 and 303 are chained together. More particularly, each of the blocks comprises a block hash of the previous block. This cryptographically ties the current block to the previous block (s).

According to embodiments the transactions may be in particular execution messages which are to be executed by the nodes/replicas of the replicated computing cluster.

According to embodiments, the input blocks 301, 302 and 303 may be created by a proof-of-stake consensus-protocol.

However, it should be noted that the input blocks generated by the consensus component do not need to be chained together according to embodiments. Rather any consensus protocol that reaches some kind of consensus between the nodes on the selection and/or processing order of received messages may be used according to embodiments.

FIG. 4 shows the evolution of registry versions of a central registry, e.g. the central registry 21 of the central control unit 20 as explained with reference to FIG. 1. More particularly, FIG. 4 shows three consecutive registry versions 10, 11 and 12. Each of the registry versions comprises subnetwork information for the respective subnetwork/subnets, in this example of the subnets A and B.

The subnetwork information comprises the respective members of the subnetworks as well as the software versions of the replica to be used by the nodes of the respective subnetwork. The software versions may also be denoted just as replica versions. In the following the terms software version and replica version may be used interchangeably. As an example, the registry version 10 specifies that subnetwork A comprises the members X, Y and Z and shall use the replica version v1, while subnetwork B comprises the members U, V and W and shall use the replica version v2. The CCU 20 can trigger an upgrade process by simply changing the replica version in the registry 21. This will then be observed by the nodes of the respective subnetwork.

Figure 5:
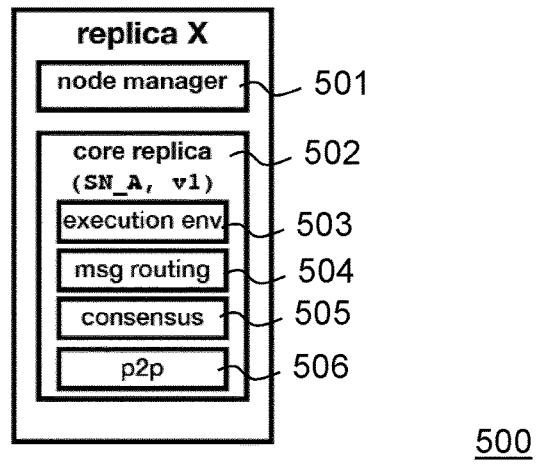
FIG. 5 illustrates an exemplary replica in more detail.

FIG. 5 illustrates an exemplary replica 500, X in more detail. The replica 500 comprises a node manager 501 and a core replica 502. The core replica 502 runs in this example on the subnetwork SNA and it has a software version v1 of the replica. The core replica 502 encompasses an execution environment 503, a component 504 for message routing, a component 505 for reaching a consensus, in particular a consensus on the input blocks to be processed by the subnetwork SNA and a component 506 for peer-to-peer (p2p) communication between the nodes of the subnetwork SNA.

According to embodiments, the software upgrades of the replica version encompass in particular a software upgrade of the software version of the core replica 502 and its components.

Figure 6:
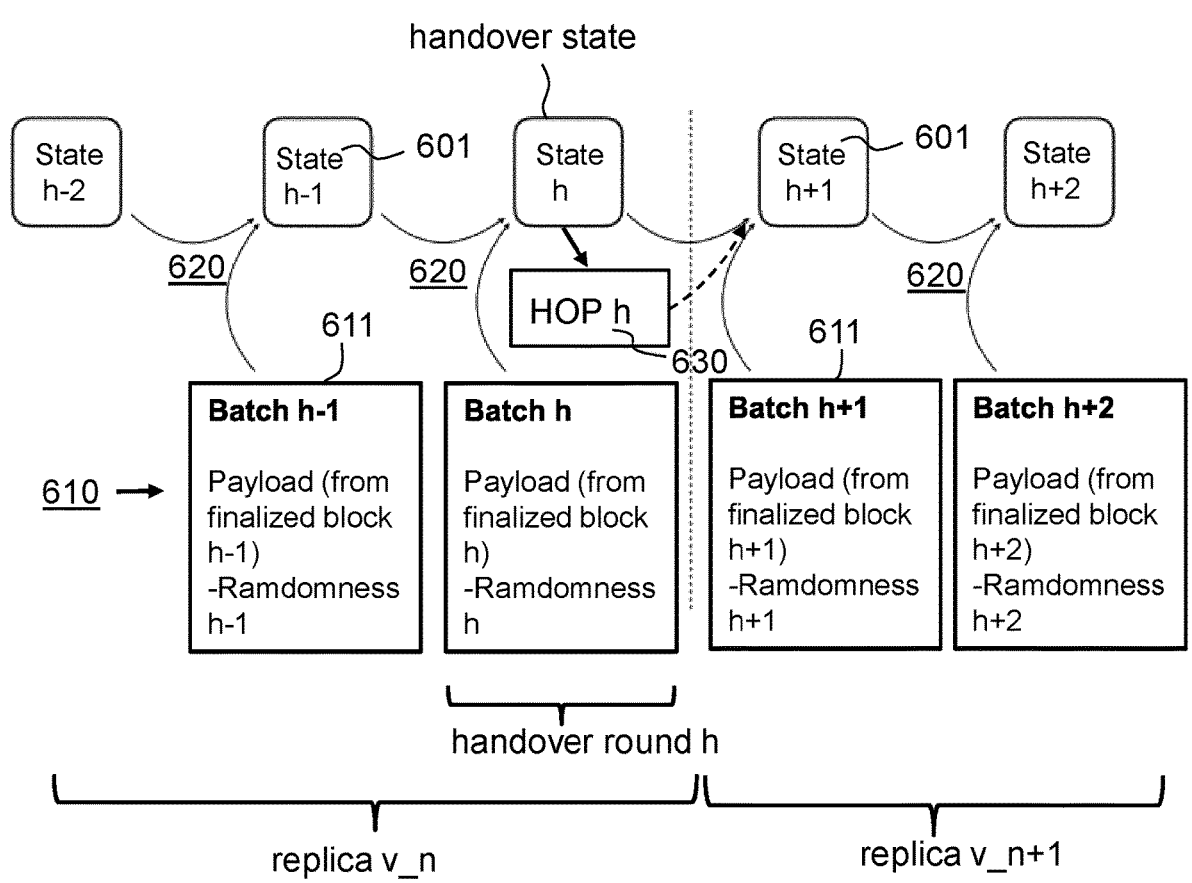
FIG. 6 illustrates a software upgrade of the software versions of the replicas of a distributed network.

FIG. 6 illustrates a software upgrade of the software versions of the replicas of a distributed network, in particular of the software replicas of a subnetwork, e.g. the subnetwork SNA of FIG. 1.

Each of the replicas performs a batchwise processing of input blocks 611 of a blockchain 610. More particularly, the replicas perform consecutive processing rounds 620 comprising a consecutive processing of the input blocks 611 in a deterministic and replicated manner. Each of the consecutive processing rounds is based on the former round state and accordingly takes the former round state and a new input block as input and computes a new round state 601 as output. As an example, the first illustrated processing round 620 takes the round state h−2 as input state and the input block of the block height/batch height h−1 as input block and computes the new round state h−1. By this batchwise or blockwise processing, the replicas traverse a chain of round states of a state height h−2, h−1, h, h+1 and h+2. Each of the input blocks 611 comprise a payload and some randomness.

The replicas perform a software upgrade of the software version of the replica at a pre-agreed handover round h and an associated handover state h. More particularly, the distributed network performs the processing rounds h−2, h−1 and h with the current replica version v_n and the subsequent processing rounds h+1, h+2, . . . with a new replica version v_n+1. In this respect the handover state h and the handover round h establish a clear cut-off or in other words reference point between the two replica versions.

The nodes of the respective replicated computing cluster/subnetwork compile at the handover round a handover package HOP h, 630 and provide the handover package HOP h, 630 upon request to other nodes of the replicated computing cluster. The handover package enables these other nodes, e.g. nodes which are during the software upgrade one or more processing rounds behind the other nodes of the replicated computing cluster, an obtainment of the handover state. Such a providing of the handover package allows the respective catch-up node to successfully upgrade to the new software version v_n+1 of the replica even if the other nodes of the replicated computing cluster have already upgraded its replica version to the new software version v_n+1. According to embodiments the handover package HOP h may comprise in particular the round state h or a hash of the round state h. In addition, the handover package HOP h may comprise the input block of the height h+1 such that the catch-up node can process the next state of height h+1 from the handover package HOP h.

Figure 7A:
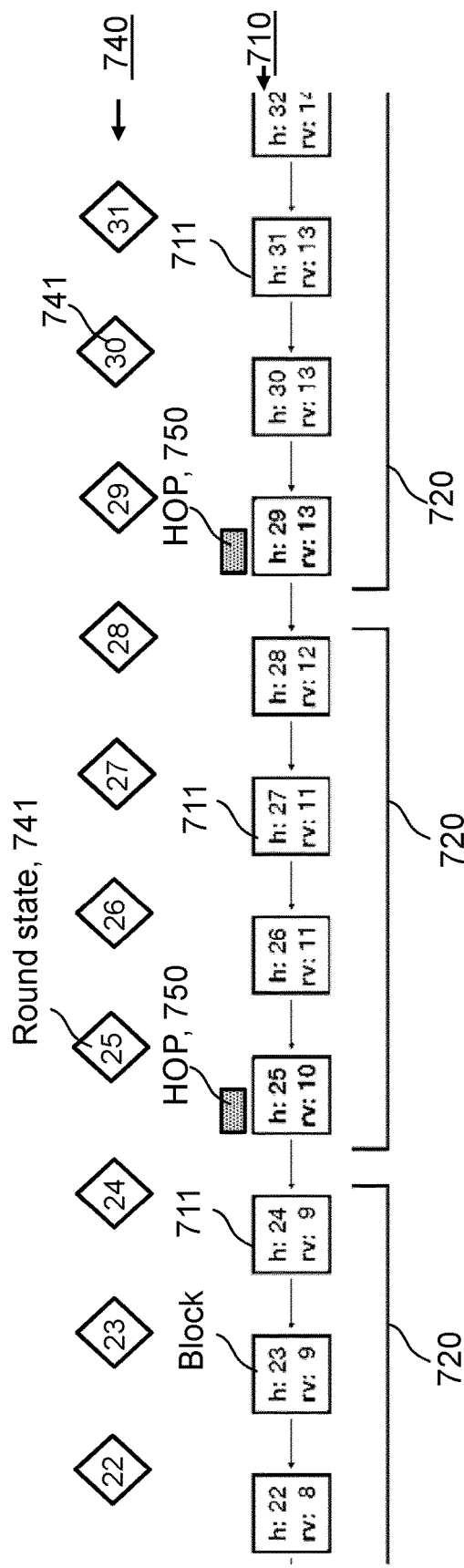
FIG. 7a shows a timing diagram of the creation of handover packages according to embodiments of the invention.

FIG. 7a illustrates a t diagram of software upgrades of replicas of a distributed network according to an embodiment of the invention. More particularly, FIG. 7a shows a blockchain 710 comprising input blocks 711 with block heights h from 22 to 32. According to the illustrated example, a number of 4 blocks establishes predefined upgrade intervals 720 of 4 input blocks 711 of the blockchain 710. Corresponding to the blockchain 710 the nodes of the distributed network compute a chain 740 of round states 22-31. The round states 22-31 are commonly denoted with reference numeral 741 and are furthermore illustrated with a rhomb. The nodes of the corresponding subnetwork/replicated computing cluster traverse the chain 740 of round states and move to the next round state h after having executed the corresponding input block of height h. As an example, the nodes of the respective subnetwork/replicated computing cluster move to the round state h=24 after having executed the input block of height h=24. For this reason, the rhombs 741 which represent the round states in FIG. 7a are shown a bit offset to the corresponding input blocks 711.

In the example of FIG. 7a, a handover package HOP, 750 is created at a pre-agreed processing round of each of the upgrade intervals 720, in this example at each first processing round of the upgrade intervals 720. According to embodiments, the handover package may also be denoted as catch-up package or recovery package.

The handover package HOP comprises the corresponding round state or a hash of the round state of the corresponding processing round. As an example, referring to FIG. 7a, the handover package HOP, 750 of the processing round h=25 comprises the round state 24 which corresponds to the round state after the execution of the input block 24.

The embodiment according to which the handover package comprises only a hash of the round state has the advantage that a node that wants to use the handover package may check first the hash and only download the complete round state in case of a positive verification of the hash. In such an embodiment the handover package may comprise the hash together with all keys and certificates needed to verify it. This may avoid to download the complete state unnecessarily. In case the verification of the hash is positive, the (complete) round state itself may be fetched separately.

According to embodiments, the handover package HOP, 750 may be added to a block of the blockchain. According to embodiments, each first block of the upgrade intervals 720 comprises a handover package HOP, 750.

Figure 7B:
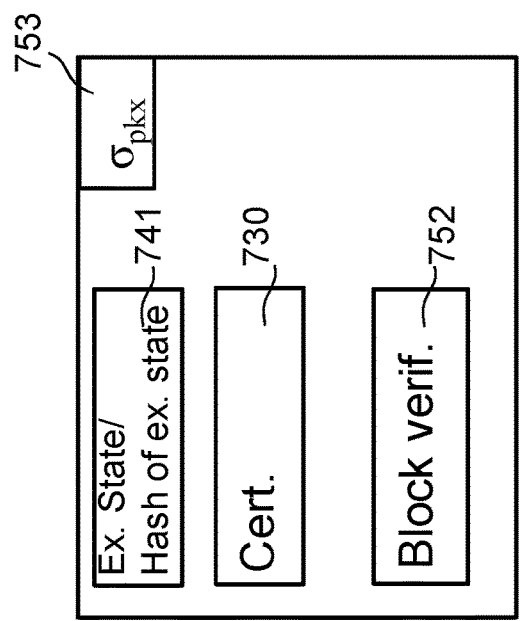
FIG. 7b shows a block diagram of a handover package.

FIG. 7b shows a more detailed block diagram of a handover package HOP, 750. The handover package HOP, 750 comprises at first a round state/execution state 741. In addition, the handover package HOP, 750 comprises a certificate 730.

Furthermore, the handover package HOP, 750 comprises block verification information 752. Such block verification information 752 may comprise in particular the information which is needed to verify subsequent blocks of the blockchain, in particular the validity of subsequent blocks. In this respect, subsequent blocks are the blocks that are to be executed subsequent to the round state of the handover package. The block verification information may comprise in particular a set of verification keys which are required to verify the validity of blocks of the blockchain.

The complete handover package HOP, 750 is signed with a joint signature $\sigma_{pkx}$ by a predefined minimum number of secret key shares which correspond to a verification key $pk_X$ of the respective subnetwork.

The certificate 730 comprises the verification key/verification information needed to verify $pk_X$. After verification of $pk_X$ with the verification key certificate, a respective node can verify the signature $\sigma_{pxX}$ on the handover package HOP, 750 with the verified verification key $pk_X$.

It should be noted that the certificate 730 may not need to be included in the handover package according to embodiments, but it may also be communicated to a respective catch-up node via another communication channel.

Figure 8:
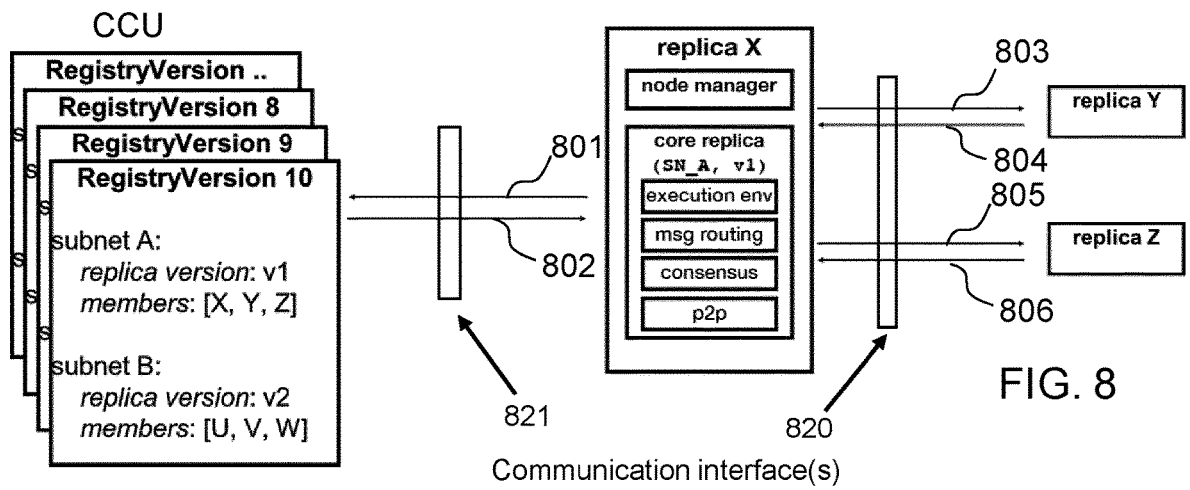
FIG. 8 illustrates how a replica which has fallen behind the other replicas may catch up.

FIG. 8 illustrates how a replica X which has fallen behind the other replicas, in particular during a software upgrade of the other replicas, may catch up. At first, the replica X may request, at a step 801, some information from the registry about the latest registry version, in this example from the registry version 10. This may include questions/requests such as to which subnetwork the replica belongs, who are the peers of the replica and which replica version the subnetwork has been using. At a step 802 the replica X may receive the requested information from the registry. Then, at a step 803 the replica X may ask the replica Y for the latest available handover package of its subnetwork A. At a step 804 the replica X may receive the corresponding handover package from the replica Y. In addition, for example to double check, the replica X may send at a step 805 another request for a handover package to the replica Z. In return, it may receive at a step 806 the latest handover package also from the replica Z. Then the replica X may start to catch-up and synchronize its own state based on the received handover package.

The communication between the replica X and the replicas Y and Z may be performed via a communication interface 820 that is independent of the software upgrades and the software version of the replicas. This ensures that replicas of different software versions may still communicate with each other. This allows in particular that the replicas Y and Z which may have already upgraded to the new software version v1 can still communicate with the replica X which still runs the former software version v0.

Likewise, a communication interface 821 between the replicas and the central control unit CCU is independent of the software upgrades and the software version of the replicas according to embodiments.

Figure 9:
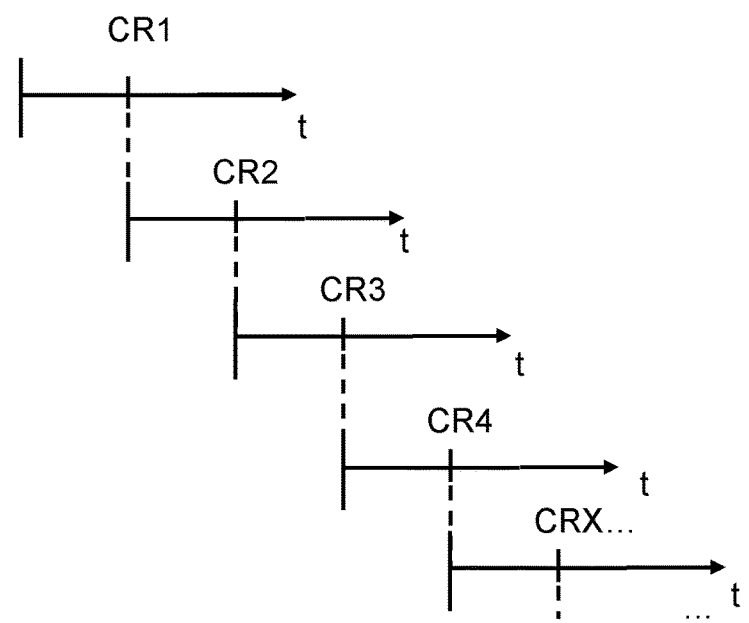
FIG. 9 shows a timing diagram of consensus rounds.

FIG. 9 shows a timing diagram of consensus rounds CRX which may be executed by a consensus subset of the nodes of the respective replicated computing cluster, i.e. by the nodes which are responsible to reach a consensus on the input blocks to be processed by the respective replicated computing cluster. The consensus rounds are performed in an overlapping manner at least partly in parallel to each other. In other words, a subsequent consensus round may already start during the execution of the previous consensus round. As an example, the consensus round CR2 may start already during the execution of the first consensus round CR1. Such a processing scheme as illustrated in FIG. 9 with overlapping consensus rounds may also be denoted as chain-based consensus.

Figure 10:
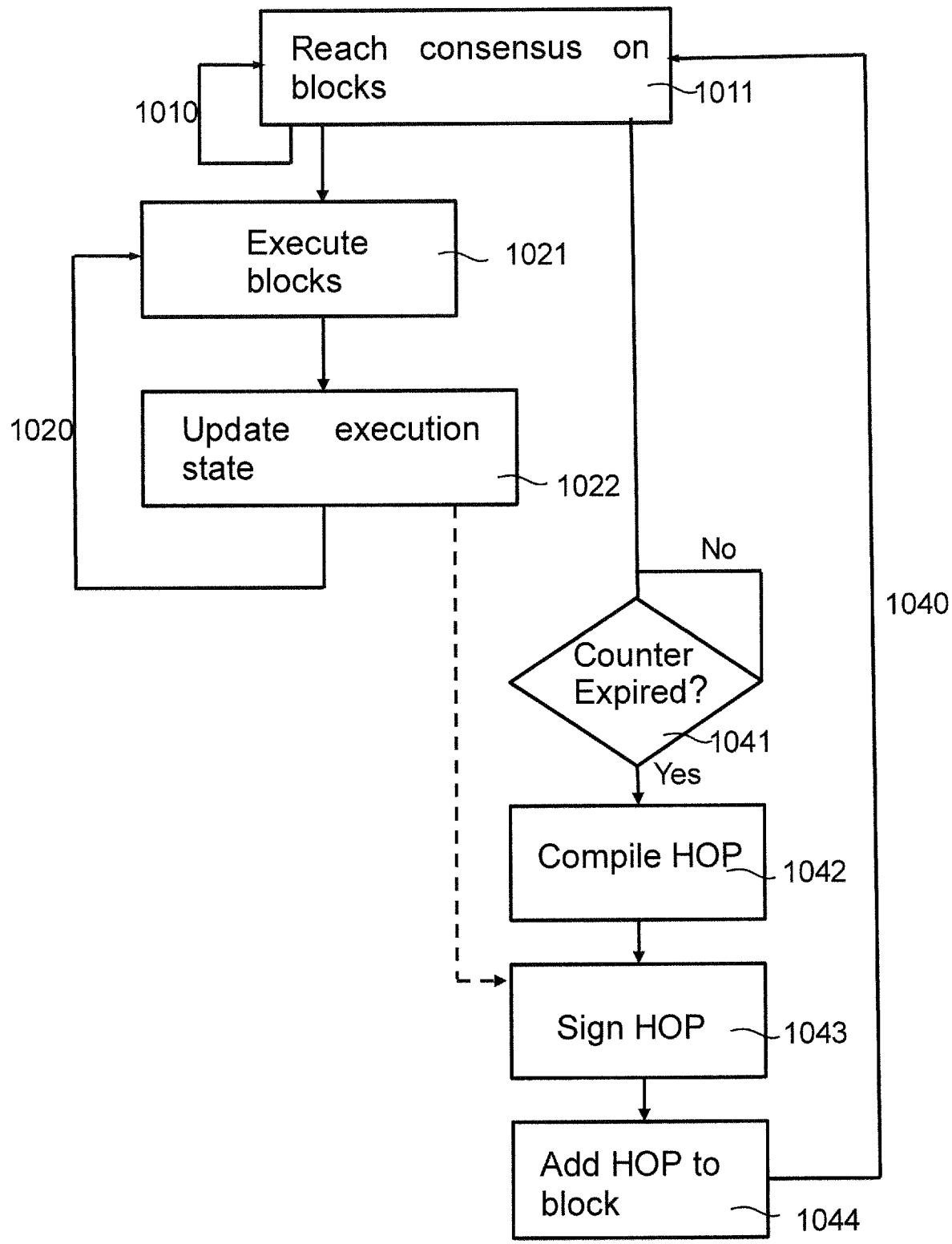
FIG. 10 shows a flow chart of method aspects of embodiments of the invention.

FIG. 10 shows a flow chart of method aspects of embodiments of the invention.

The method performs regularly, at loops 1010, a consensus protocol to reach a consensus on input blocks that shall be executed by a respective replicated computing cluster, in particular by a subnetwork. The consensus protocol may be performed by a consensus subset of the nodes of the network, in particular by a consensus subset of a subnetwork. The loop 1010 comprises steps 1011 at which the nodes of the consensus subset reach a consensus on a new input block. The input blocks may be numbered with an increasing height index N. N may be an increasing integer, i.e. e.g. 0, 1, 2, 3 . . . . N. The height index may also be denoted as block height.

The payload of the input blocks that have been agreed is then individually executed, at steps 1021, by the computational units of the nodes of the corresponding replicated computing cluster in a deterministic manner.

As a result of the execution, the nodes/replicas of replicated computing cluster update their round state at steps 1022. As explained above, the different nodes of the replicated computing cluster may operate at different positions of the chain at a certain point in time. The steps 1021 and 1022 are repeated in loops 1020.

Furthermore, the method comprises loops 1040 for generating/compiling and signing a handover package HOP. The handover package HOP is not generated for every block, but only at every $i^{th}$ block, e.g. at every $10^{th}$, $100^{th}$ or $500^{th}$ block. This may be implemented e.g. with a counter. Accordingly, after the generation of each block, at steps 1041, a counter is triggered and it is checked whether the counter has expired. The counter may be embodied in various ways. In particular, it may be programmed to expire after a predefined number of processing loops 1010, e.g. after 10, 100 or 500 processing loops 1010.

If the counter has expired, the nodes/replicas compile, at steps 1042, a handover package HOP which may comprise the information as explained above, in particular a recent round state. Then, at a step 1043, the nodes execute a joint signature on the handover package of the current interval. According to embodiments s the joint signature may be a threshold signature and accordingly the handover package may be signed with a predefined minimum number of secret key shares corresponding to a verification key of the replicated computing cluster.

Next, at a step 1044, the handover package HOP is added to a block of the blockchain and the counter is reset.

FIGS. 11*a* to 11*f* illustrate a timing diagram of a software upgrade from of software version v1 of the core replica to a software version v2 of the core replica according to an embodiment of the invention. The software versions v1 and v2 may be in the following also simply denoted as core replica v1 and core replica v2. In the FIGS. 11*a* to 11*f*, input blocks 1111 are illustrated with a full square, input block proposals 1111*a* are illustrated with a dashed square and dummy input block proposals 1111*b* with a dotted square. Corresponding round states 1141 are illustrated with a rounded square, a notarization N of input blocks with a rhomb 1161 and a finalization F of an input block with a rhomb 1171. Furthermore, according to this embodiment a chain 1180 of random seeds 1181 is also produced, the random seeds illustrated with a circle. A certification 1131 is illustrated with a favour.

According to this example, the core replica version v1 is responsible for the processing of the input blocks 1111 up to and including the block height/round height 30. Accordingly, the processing round 30 is a handover round and the state after the processing of the input block 30 is a handover state.

The round height 30 may also be denoted as handover height. At the handover round 30 a handover package shall be constructed/computed. As illustrated above in FIG. 9, the replicated computing cluster may run the consecutive consensus rounds in an overlapping manner at least partly in parallel to each other. Accordingly, the handover package for height 30 can only be created once the replicated computing cluster has finally reached consensus on the corresponding input block 30, i.e. once the input block 30 of the handover round 30 has been finalized. According to embodiments, the consensus protocol may perform a two-stage processing comprising as a first stage a notarization round for performing a notarization of input block proposals by the nodes/replicas of the replicated computing cluster and as a second stage a finalization round for finalizing the input block proposals. During the notarization round a first check according to a first rule set may be performed by the nodes of the replicated computing cluster and during the finalization round a second check according to a second rule set. The finalization rounds may be based on the result of the notarization rounds. During the notarization rounds and the finalization rounds there may be a plurality of pending block proposals and a finalization of the input block 30 of the handover round may depend on the finalization of descendent blocks.

Figure 11A:
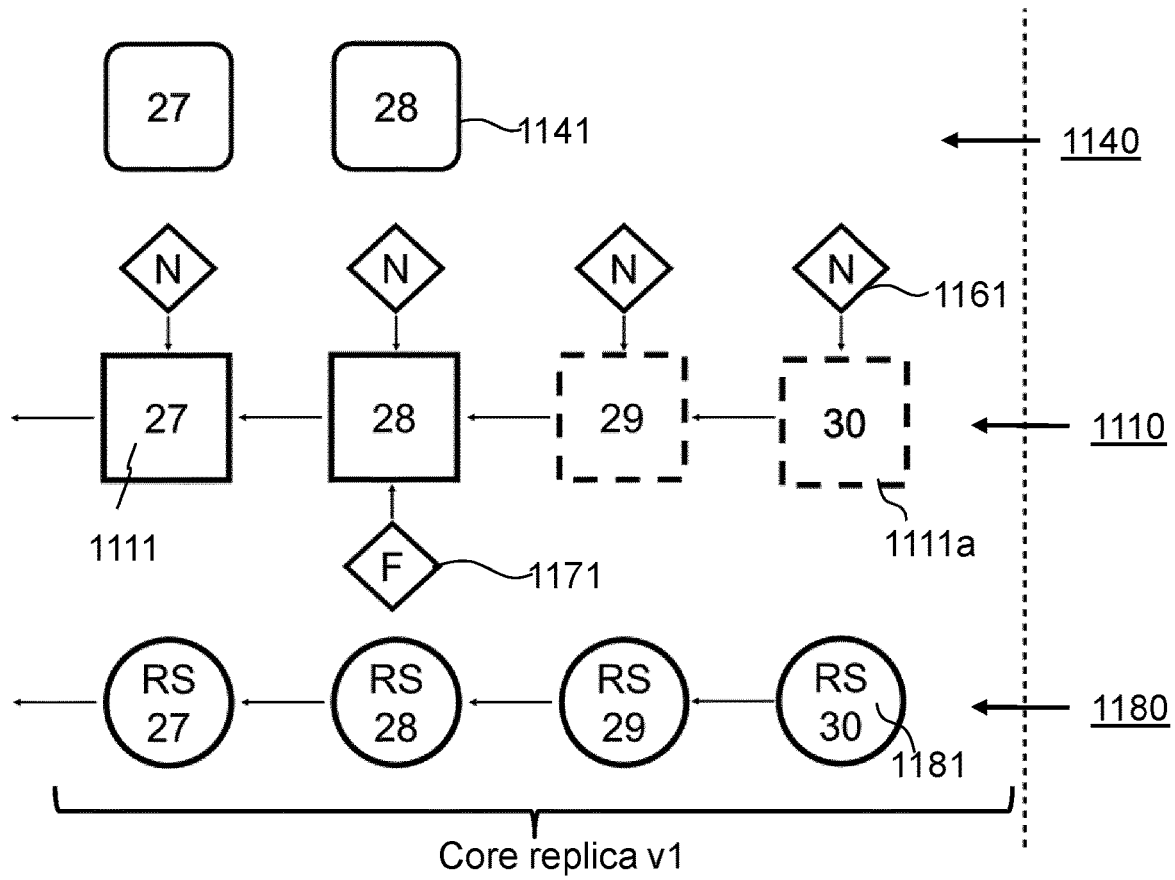
FIGS. 11a to 11f illustrate a timing diagram of a software upgrade from of software version v1 of the core replica to a software version v2 of the core replica according to an embodiment of the invention.
Figure 11A:
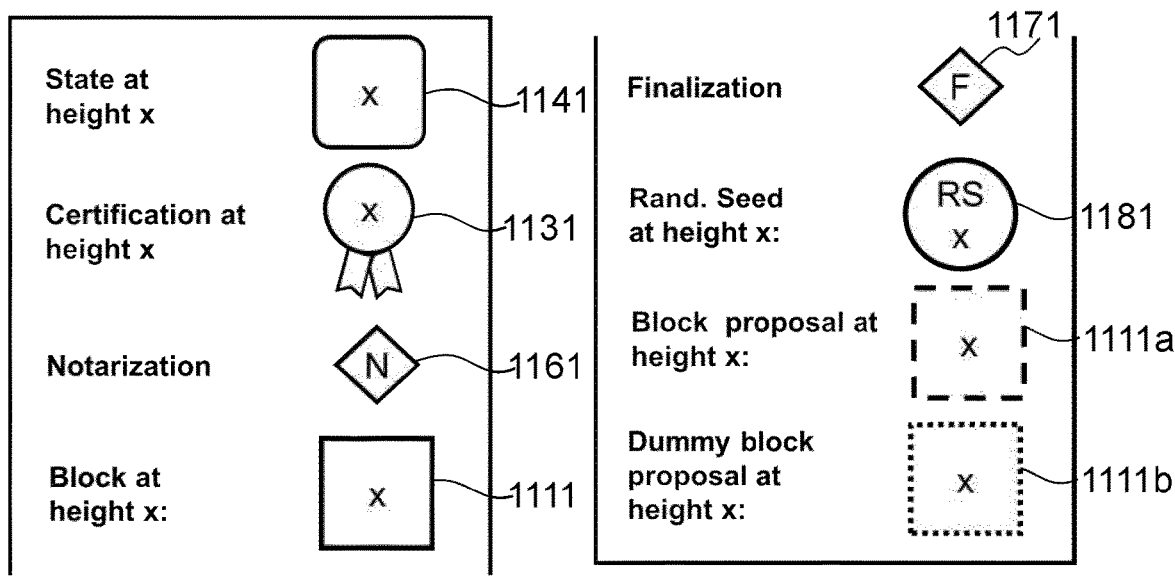

Referring now to FIG. 11*a*, the input blocks 27 and 28 have been notarized and finalized, while the input block proposals 29 and 30 have been notarized only, but not finalized, and are hence still input block proposals. It should be noted, that there may be other pending input block proposals for the rounds 29 and 30, which are not shown for ease of illustration.

Figure 11B:
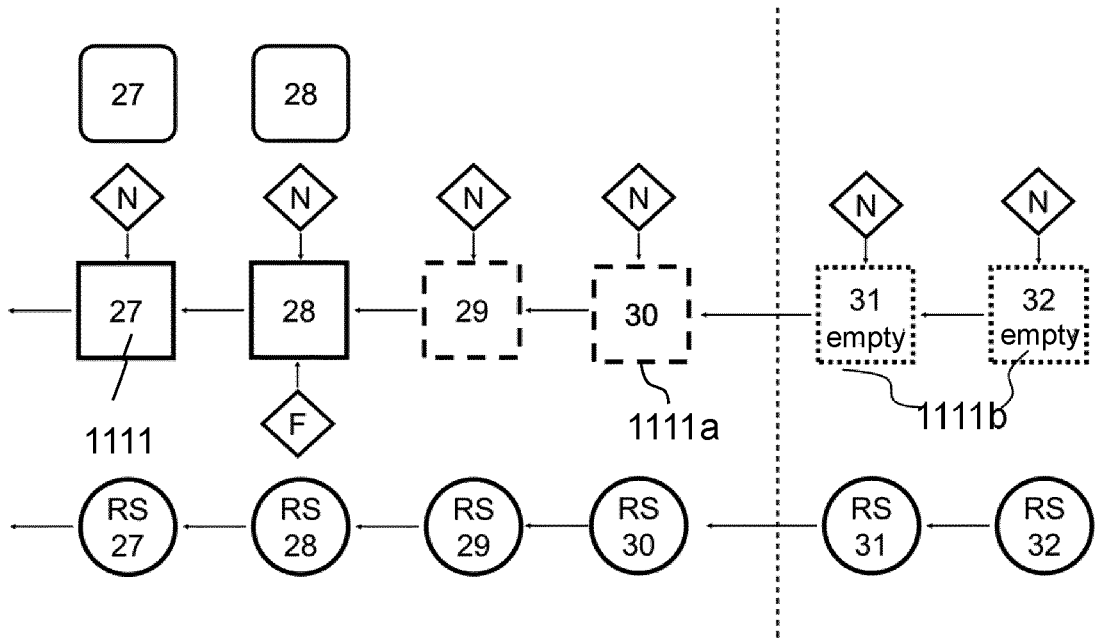

As a finalization of the input block 30 may happen indirectly (via a finalization of a descendent block), methods according to embodiments of the invention continue to create, after having reached the handover round 30, consecutive dummy input block proposals 1111*b* until a final agreement on the input block of the handover round 30 has been reached. This is illustrated in FIG. 11*b*. The further creation of input block proposals past height 30 may ensure according to embodiments that height 30 will eventually be finalized. More particularly, dummy input block proposals 1111*b* have been created for the processing rounds 31 and 32. According to embodiments of the invention the dummy input block proposals 1111*b* are not allowed to have any meaningful payload. More particularly, their only purpose is to reach a final agreement on height 30. This avoids that a payload of an input block is processed with the former software version v1.

Figure 11C:
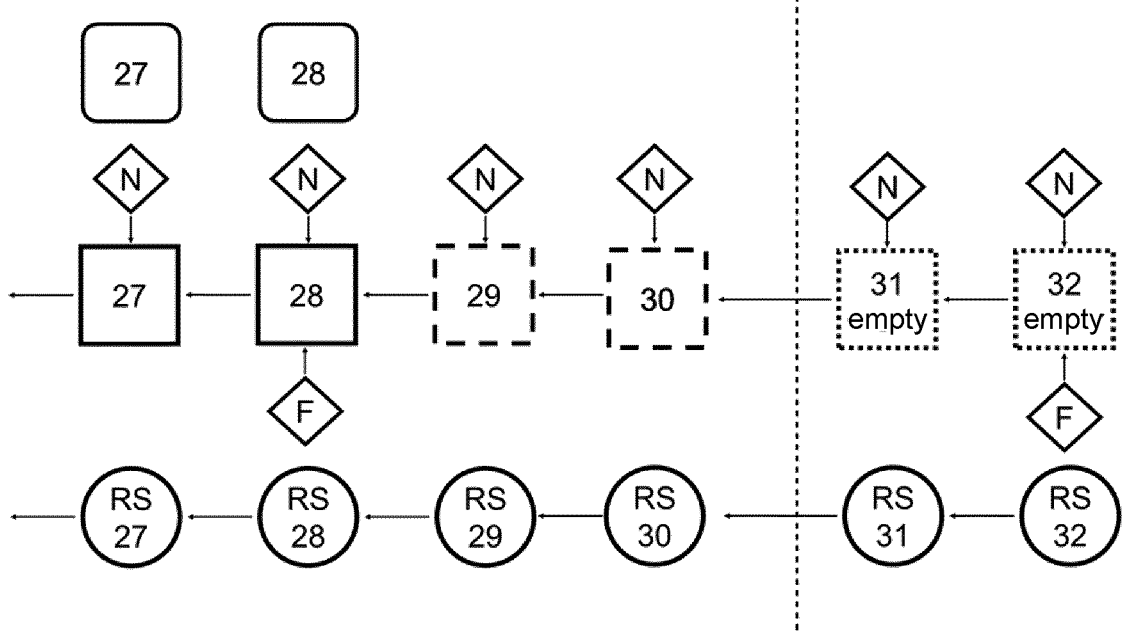

Then, as shown in FIG. 11*c*, the dummy input block proposal 32 has been finalized and the method according to embodiments stops creating further input block proposals and random seeds. In general, once there is a finalized height>=the handover height, it is stopped to create further dummy input block proposals and random seeds.

Figure 11D:
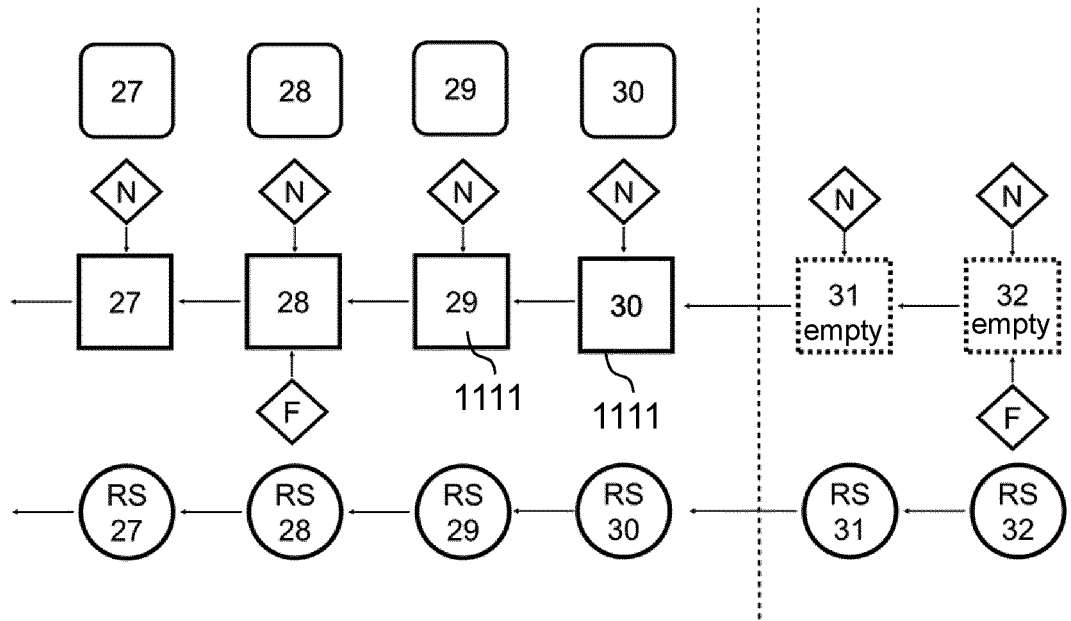

Next, as shown in FIG. 11*d*, the consensus mechanism can finalize the input block proposals 29 and 30 to input blocks and deliver batches up to height 30 such that the replicated states up to height 30 can be computed.

Figure 11E:
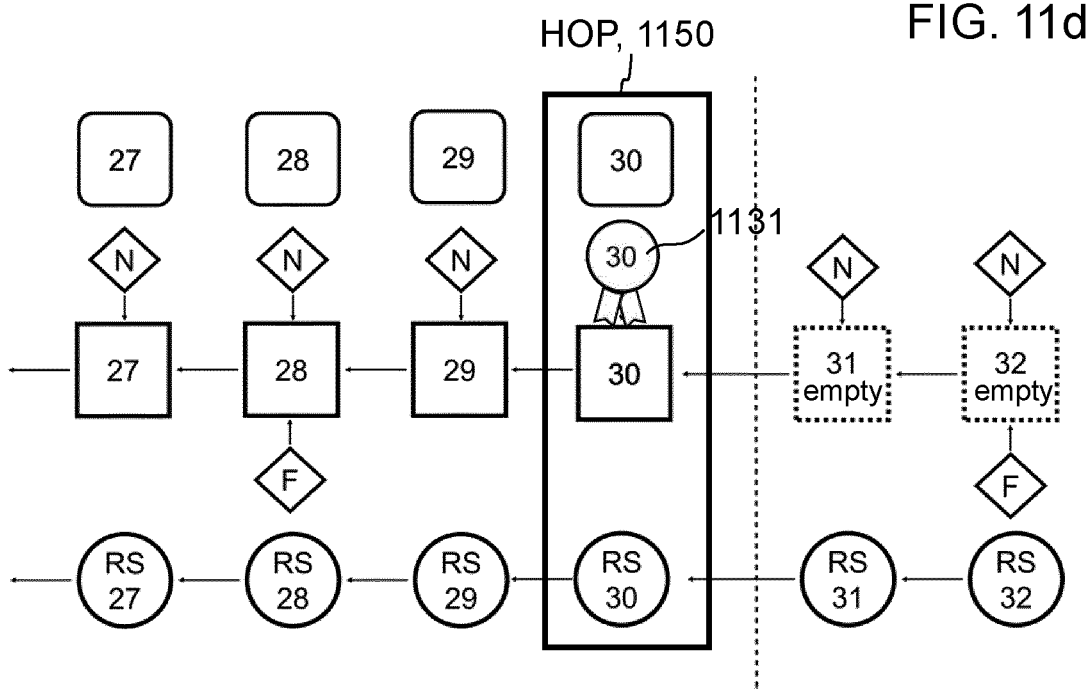

Then, as shown in FIG. 11*e*, a certification 1131 of the state 30 and a handover package HOP, 1150 for height 30 can be created. The certification of the state 30 may involve the execution of a joint signature on the state 30 by the nodes of the corresponding replicated computing cluster. After the construction of the HOP for height 30, the core replica version v1 is ready to stop. Then the new core replica version v2 may be installed and the processing may continue with the new core replica version v2. According to embodiments, the handover package HOP, 1150 can be parsed and understood by both replica versions, i.e. by replica version v1 and by replica version v2. The handover package HOP, 1150 comprises the round state and the input block of the handover round 30.

Figure 11F:
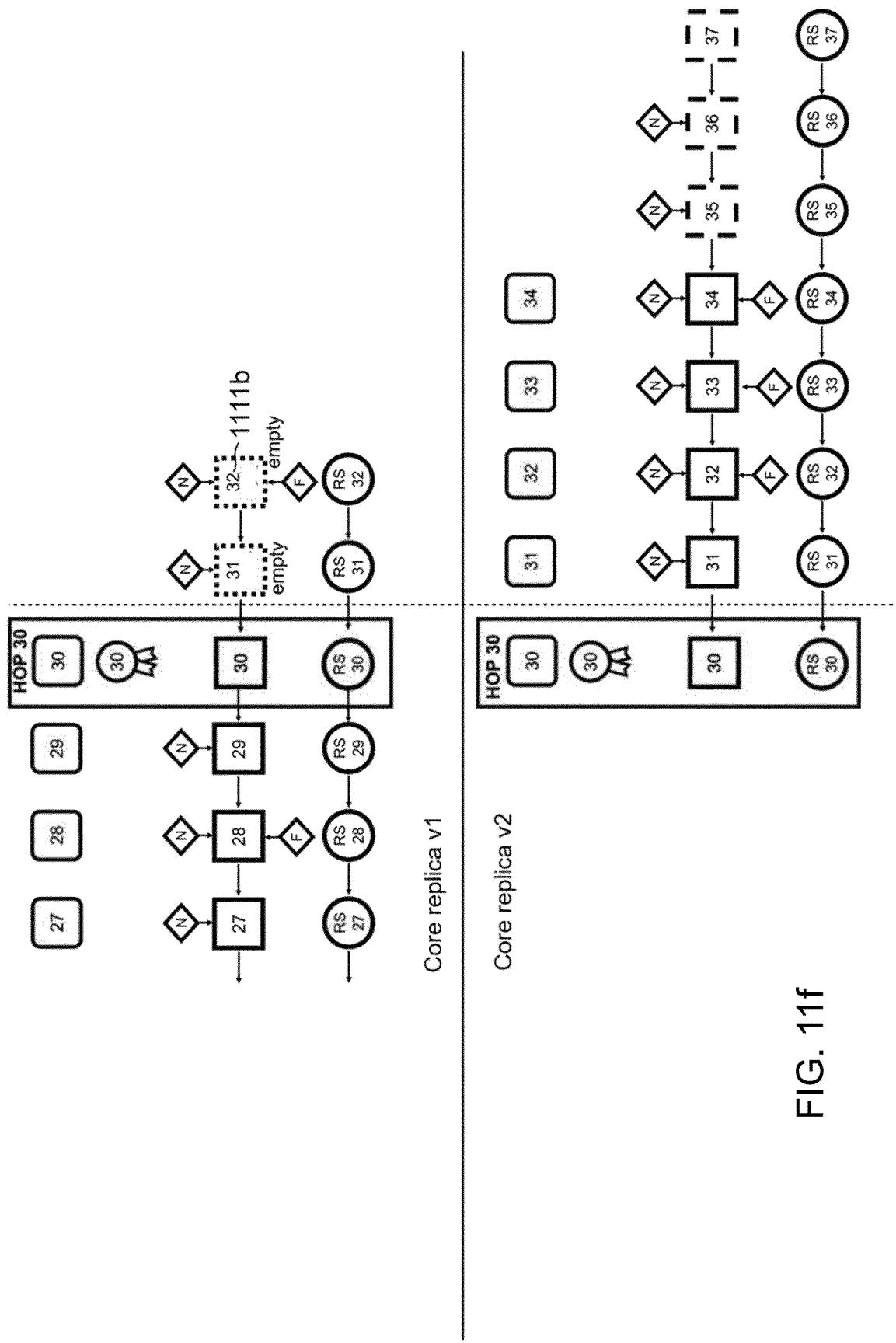

FIG. 11*ff* illustrates an overview of the handover mechanism between the core replica versions v1 and v2. The upper part of FIG. 11*f* illustrates the processing performed by the core replica version v1 and the lower part the processing performed by the core replica version v2. The new processing rounds 31*ff* start from the handover state 30 as certified in the handover package HOP 30 of the handover round 30. In this respect the handover package HOP 30 of round 30 establishes a clear cut-off or in other words reference point between the processing performed by the core replica version v1 and the processing performed by the core replica version v2. The dummy input block proposals 1111*b* may be discarded and new regular input block proposals based on the handover state 30 may be computed. In FIG. 11*f* the input blocks 31-34 have been already finalized, while the input block proposals 35-37 have not been finalized yet.

Figure 12:
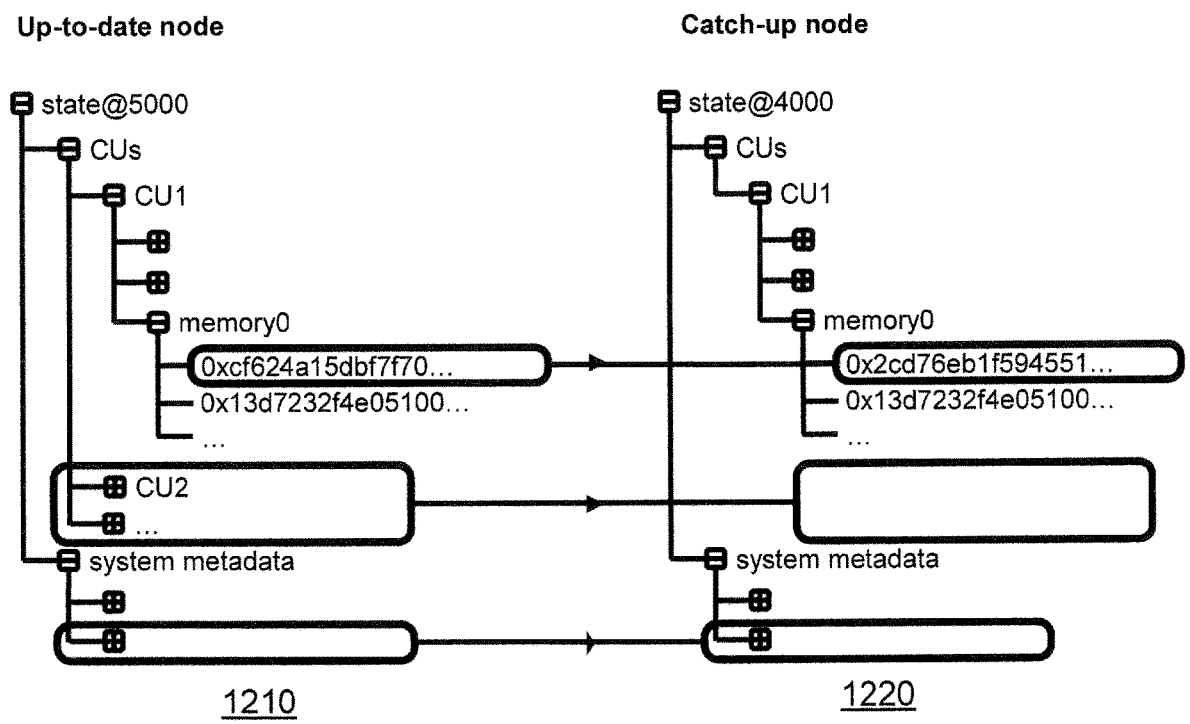
FIG. 12 illustrates a synchronization between an up-to-date node and an outdated catch-up node.

FIG. 12 illustrates a synchronization between an up-to-date node 1210 that has a round state state@5000 and an outdated node (catch-up node) 1220 that has an outdated state state@4000. The round state state@5000 may be in particular a handover state of a handover round. The round states are provided as tree-structured data. Such a round state may have a total size of multiple Gigabytes. For an efficient storage on disk it may comprise e.g. 64 Kbytes memory pages. The round states comprises round state information of the computational units as well as system metadata. The round state information of the computational units comprises computational results of the computation of the payload of input blocks. The round state information may be stored as memory pages. The system metadata may include other state maintained by the system on behalf of the computational units and context and callbacks for outstanding messages. According to embodiments the leaves of the tree-structured data may comprise only the hashes of the corresponding data, e.g. of the respective memory page.

According to an embodiment, the round state may be provided as a Merkle-tree structure. According to embodiments, the handover package may store as round state information only the hash root of the tree structure, in particular of the Merkle-tree structure. This facilitates a memory-efficient storage.

The tree-structure facilitates an efficient synchronization between a node that is up-to-date and a catch-up node that is outdated and wants to resume participation in the distributed network, in particular at a handover round. According to an embodiment, the catch-up node 1220 may request from the up-to-date node 1210 only the leaf hashes of the tree-structure and compare the leaf hashes of its own state with the leaf hashes of the up-to-date node. In a further step, the catch-up node 1220 may request then from the up-to-date node 1210 only the state information which corresponds to leaves with different leaf hashes. This avoids to download a complete handover package, but only the part of the handover package that is different from the state of the catch-up node.

Figure 13:
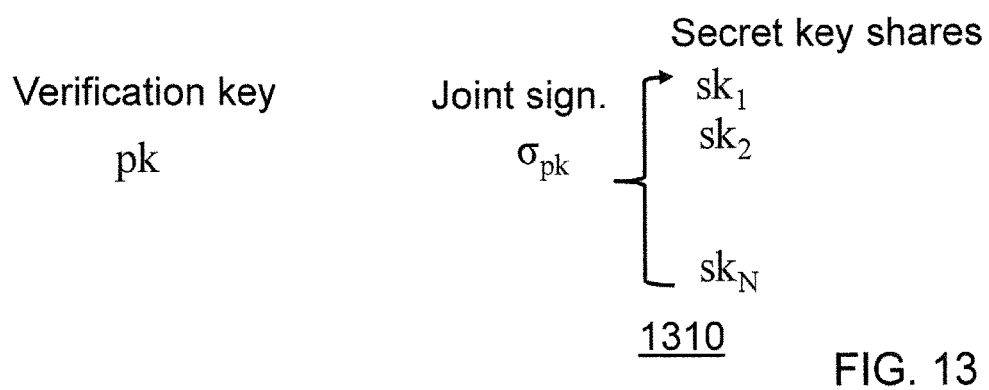
FIG. 13 shows an embodiment of keys which are generated by a distributed threshold key generation protocol.

FIG. 13 shows an embodiment of keys 1310 which may be generated by a distributed threshold key generation protocol. The keys 1310 may be used by the nodes of a replicated computing cluster to sign a handover package. It is assumed for this example that a number N of nodes participate in the distributed key generation protocol. Each of the N nodes have a secret key share ski, wherein i=1, ..., N. The N nodes have generated jointly a common public key pk, wherein a predefined threshold, e.g. at least two thirds or a third of the nodes need to use their secret key shares to create a joint signature $\sigma_{pk}$, e.g. on a handover package. The public verification key pk can then be used to verify the joint signature, e.g. by a catch-up node.

According to other embodiments, also a multi-signature or an aggregated signature scheme may be used to sign the handover package/handover state.

Figure 14:
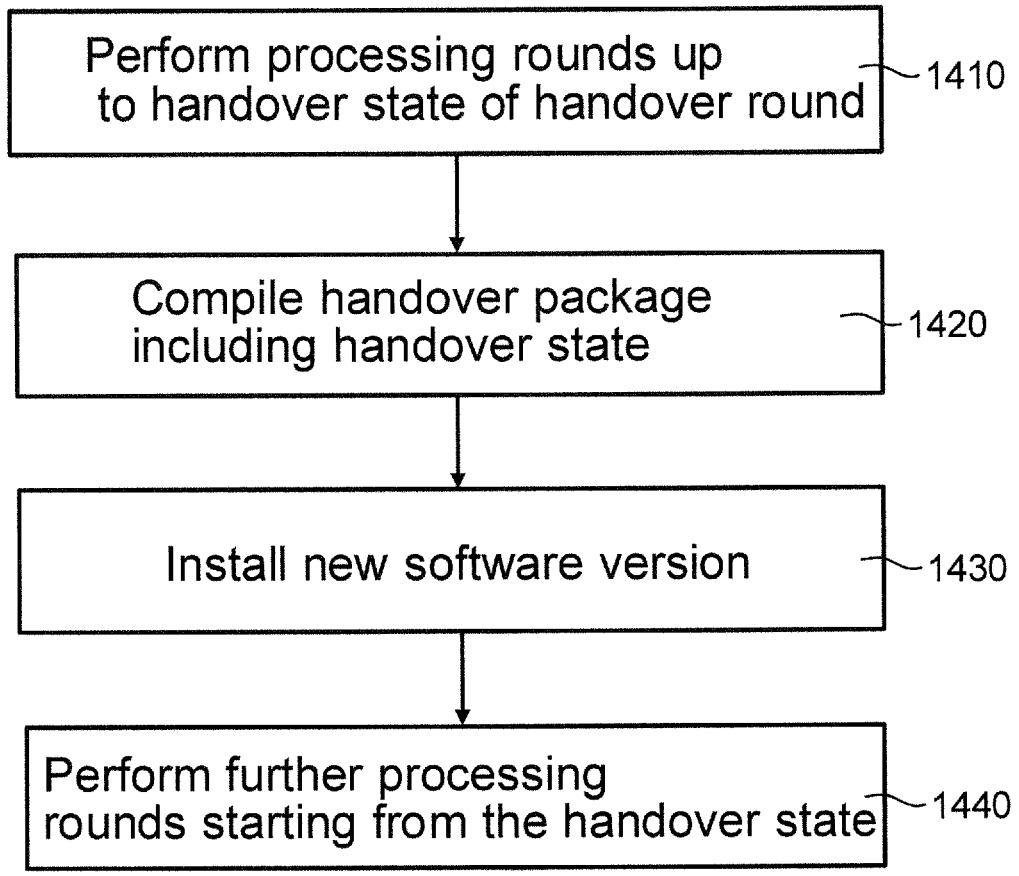
FIG. 14 shows a flow chart of methods steps of a computer-implemented method for performing software upgrades.

Referring now to FIG. 14, a flow chart of methods steps of a computer-implemented method for performing software upgrades from a current software version of a replica to a new software version of the replica is shown.

At steps 1410, the methods performs processing rounds up to and including a computing of a handover state of a pre-agreed handover round with a current software version of the replica.

At a step 1420, the nodes of the distributed network compile and/or compute a handover package which includes the handover state of the handover round.

At a step 1430, the nodes/replicas install the new software version of the replica.

Then, at steps 1440, the nodes/replicas may perform the further processing rounds subsequent to the handover round with the new software version of the replica. The further processing rounds start from the handover state as reference point or in other words cut-off point.

Figure 15:
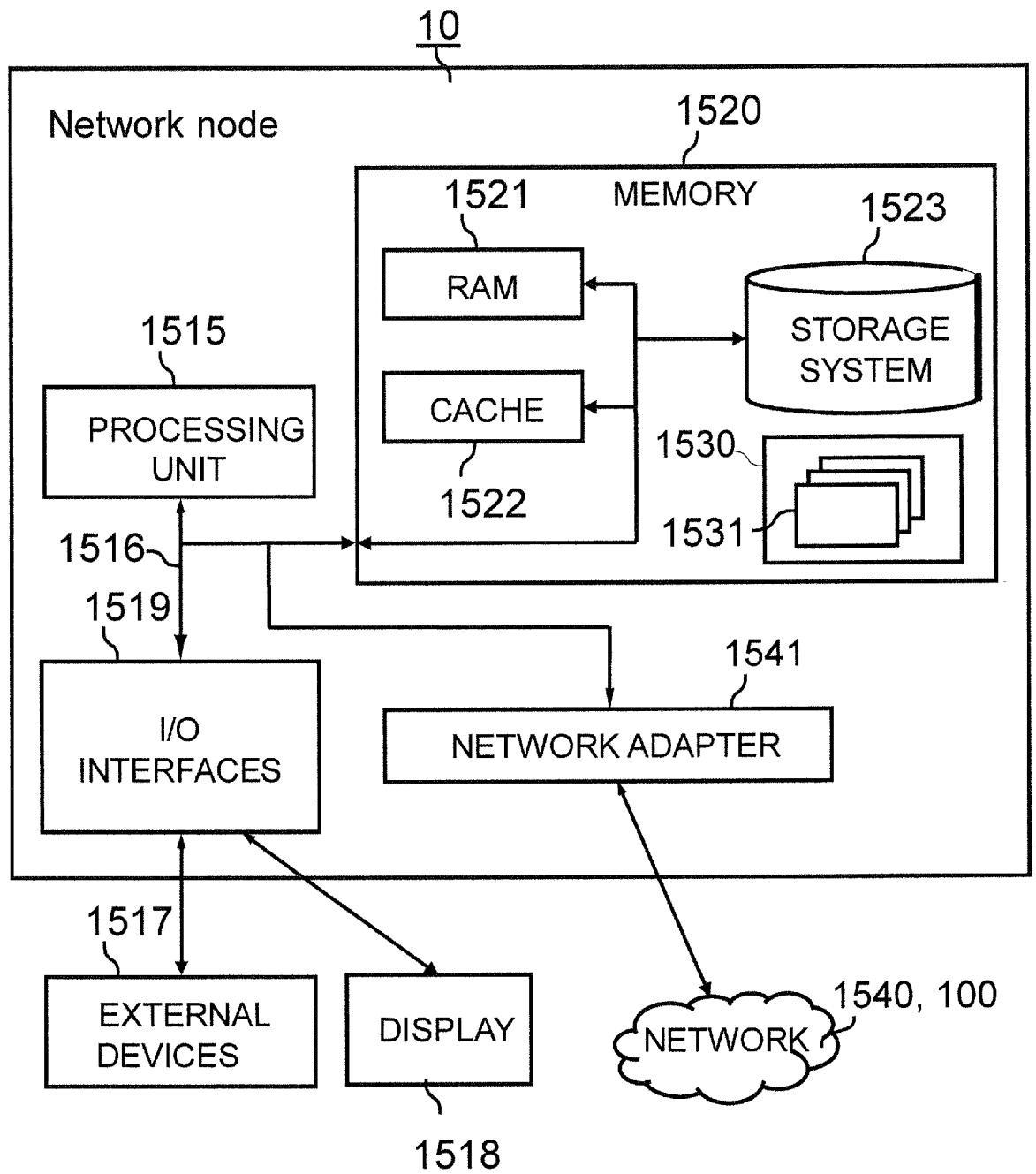
FIG. 15 shows an exemplary embodiment of a node according to an embodiment of the invention.

Referring now to FIG. 15, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform a computer-implemented method for operating a distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1515, a system memory 1520, and a bus 1516 that couples various system components including system memory 1520 to processor 1515.

Bus 1516 represents one or more of any of several types of bus structures, including a memory bus or memory controller, a peripheral bus, an accelerated graphics port, and a processor or local bus using any of a variety of bus architectures.

Network node 10 typically includes a variety of computer system readable media.

System memory 1520 can include computer system readable media in the form of volatile memory, such as random access memory (RAM) 1521 and/or cache memory 1522. Network node 1510 may further include other removable/non-removable, volatile/non-volatile computer system storage media. By way of example only, storage system 1523 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 1516 by one or more data media interfaces. As will be further depicted and described below, memory 1520 may include at least one computer program product having a set (e.g., at least one) of program modules that are configured to carry out the functions of embodiments of the invention.

Program/utility 1530, having a set (at least one) of program modules 1531, may be stored in memory 1520 by way of example, and not limitation, as well as an operating system, one or more application programs, other program modules, and program data. Each of the operating system, one or more application programs, other program modules, and program data or some combination thereof, may include an implementation of a networking environment. Program modules 1531 generally carry out the functions and/or methodologies of embodiments of the invention as described herein. Program modules 1531 may carry out in particular one or more steps of a computer-implemented method for operating a distributed network e.g. of one or more steps of the methods as described above.

Network node 10 may also communicate with one or more external devices 1517 such as a keyboard or a pointing device as well as a display 1518. Such communication can occur via Input/Output (I/O) interfaces 1519. Still yet, network node 10 can communicate with one or more networks 40 such as a local area network (LAN), a general wide area network (WAN), and/or a public network (e.g., the Internet) via network adapter 1541. According to embodiments the network 1540 may be in particular a distributed network comprising a plurality of network nodes 10, e.g. the network 100 as shown in FIG. 1. As depicted, network adapter 1541 communicates with the other components of network node 10 via bus 1516. It should be understood that although not shown, other hardware and/or software components could be used in conjunction with network node 10.

Aspects present invention may be embodied as a system, in particular a distributed network comprising a plurality of subnetworks, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, optical an storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A distributed network, the distributed network comprising a replicated computing cluster, the replicated computing cluster comprising a plurality of nodes, wherein each of the plurality of nodes of the replicated computing cluster is configured to run a replica, wherein each of the replicas is configured to run one or more computational units, wherein the one or more computational units are pieces of software which have their own unit state;

perform consecutive processing rounds comprising a consecutive processing of input blocks comprising a plurality of transactions in a deterministic and replicated manner, thereby computing a sequence of round states;

perform software upgrades of the replica at handover states of the round states at pre-agreed handover rounds of the consecutive processing rounds;

provide, upon request of another replica, via a communication interface that is independent of the software upgrades, a handover package, the handover package being configured to enable an obtainment of the handover state; wherein the distributed network is configured to perform the software upgrades from a current software version of the replica to a new software version of the replica by performing the processing rounds up to and including the computing of the handover state of the pre-agreed handover round with the current software version;

installing the new software version; and performing the processing rounds subsequent to the handover round with the new software version starting from the handover state.

2. A distributed network according to claim 1, wherein the handover package comprises the handover state or a hash of the handover state.

3. A distributed network according to claim 1, wherein the handover package comprises a complete set of the previous input blocks.

4. A distributed network according to claim 1, wherein the replicas of the replicated computing cluster are configured to regularly request the current handover package from other nodes of the replicated computing cluster or from an independent party at predefined request intervals.

5. A distributed network according to claim 1, wherein the replicas of the replicated computing cluster are configured to request the handover package from other nodes of the replicated computing cluster or from an independent party on demand, in particular before starting to perform the software upgrade and/or if a replica can no longer process input blocks due to a software incompatibility.

6. A distributed network according to claim 1, wherein the pre-agreed handover rounds are regularly repeated at pre-defined upgrade intervals, the predefined upgrade intervals comprising a predefined number of processing rounds.

7. A distributed network according to claim 1, wherein the distributed network is configured to run a registry, the registry being configured to provide consecutive registry versions, the registry versions comprising replica versions to be used by the replicas;

trigger software upgrades of the replicas by changing the replica versions in the registry versions; and observing, by the nodes of the distributed network, the registry for changes of their replica version.

8. A distributed network according to claim 1, the distributed network being configured to perform, by a consensus subset of the plurality of nodes, consensus rounds, the consensus rounds being configured to reach a consensus on the input blocks to be processed by the plurality of nodes.

9. A distributed network according to claim 8, the distributed network being configured to run the consecutive consensus rounds in an overlapping manner in parallel to each other;

create, after having reached a handover round, consecutive dummy input block proposals until a final agreement on the input block of the handover round has been reached;

perform the software upgrade of the replica after the final agreement; and discard the dummy input block proposals and create new input block proposals based on the handover state.

10. A distributed network according to claim 1, wherein the input blocks comprise a payload and a random seed.

11. A distributed network according to claim 1, wherein the distributed network comprises a plurality of subnetworks, wherein each of the plurality of subnetwork comprises a set of assigned nodes, wherein replicas of the assigned nodes of the plurality of subnetworks are configured to perform a deterministic and replicated computation across their respective subnetworks, thereby forming a plurality of replicated computing clusters.

12. A distributed network according to claim 11, the distributed network being configured to exchange inter-subnetwork messages between nodes assigned to different subnetworks according to a compatible communication protocol such that different software versions of the replicas of different subnetworks can communicate with each other; and exchange intra-subnetwork messages between nodes assigned to the same subnetwork according to a dynamic communication protocol.

13. A distributed network according to claim 7, wherein the distributed network comprises a plurality of subnetworks, wherein each of the plurality of subnetwork comprises a set of assigned nodes, wherein replicas of the assigned nodes of the plurality of subnetworks are configured to perform a deterministic and replicated computation across their respective subnetworks, thereby forming a plurality of replicated computing clusters, wherein the distributed network is configured to perform regular updates of the consecutive registry versions in the registry, the registry versions comprising a subnetwork allocation of the plurality of nodes and a respective software version of the replicas for each of the plurality of subnetworks; and perform, by the plurality of nodes, regular registry queries to receive changes of its respective software version.

14. A distributed network according to claim 1, wherein the software upgrade comprises:

a different consensus protocol for reaching consensus on the input blocks;

a different communication protocol for the communication between the plurality of nodes, in particular for intra-subnetwork communication; and/or processing rules for the processing of the input blocks.

15. A distributed network according to claim 1, wherein the handover package has a format that can be parsed and understood by the replicas independently from the software upgrades.

16. A distributed network according to claim 1, wherein the handover package comprises a complete set of information which allows to synchronize the round state of a node that is behind during a software upgrade with the latest handover state.

17. A distributed network according to claim 1, wherein the handover package provides the handover state as a Merkle-tree structure, in particular as the hash root of the Merkle-tree structure.

18. A distributed network according to claim 1, wherein the distributed network is configured to
  execute, by a permissible subset of the nodes of the replicated computing cluster or by a permissible subset of the nodes of a respective subnetwork, a joint signature on the handover package, in particular a threshold signature.

19. A node for a distributed network according to claim 1, wherein the node is configured to run a replica, wherein the replica is configured to
  run one or more computational units, wherein the one or more computational units are pieces of software which have their own unit state;
  perform consecutive processing rounds comprising a consecutive processing of input blocks comprising a plurality of transactions in a deterministic and replicated manner, thereby computing a sequence of round states;
  perform software upgrades of the replica at handover states of the round states at pre-agreed handover rounds of the consecutive processing rounds;
  provide, upon request of another replica, via a communication interface that is independent of the software upgrades, a handover package, the handover package being configured to enable an obtainment of the handover state; and
  perform the software upgrades from a current software version of the replica to a new software version of the replica by
  performing the processing rounds up to and including the computing of the handover state of the pre-agreed handover round with the current software version;
  installing the new software version; and
  performing the processing rounds subsequent to the handover round with the new software version starting from the handover state.

20. A non-transitory computer readable medium having stored thereon a computer program product comprising computer code for operating a distributed network, the distributed network comprising a replicated computing cluster, the replicated computing cluster comprising a plurality of nodes, wherein each of the plurality of nodes of the replicated computing cluster is configured to run a replica, the computer program product comprising a computer readable storage medium having program instructions embodied therewith, the program instructions executable by one or more of the plurality of nodes to cause the one or more of the plurality of nodes to perform a method comprising
  running one or more computational units, wherein the one or more computational units are pieces of software which have their own unit state;
  performing, by each of the replicas, consecutive processing rounds comprising a consecutive processing of input blocks comprising a plurality of transactions in a deterministic and replicated manner, thereby computing a sequence of round states;
  performing software upgrades of the replica at handover states of the round states at pre-agreed handover rounds of the consecutive processing rounds;
  providing, upon request of another replica, via a communication interface that is independent of the software upgrades, a handover package, the handover package being configured to enable an obtainment of the handover state; and
  performing the software upgrades from a current software version of the replica to a new software version of the replica by
  performing the processing rounds up to and including the computing of the handover state of the pre-agreed handover round with the current software version;
  installing the new software version; and
  performing the processing rounds subsequent to the handover round with the new software version starting from the handover state.

\* \* \* \* \*